(12) United States Patent
Marchant et al.

(10) Patent No.: US 8,643,653 B2
(45) Date of Patent: Feb. 4, 2014

(54) WEB-BASED ANIMATION

(75) Inventors: Benoit Marchant, San Jose, CA (US); Pierre Frisch, North Vancouver (CA); Dimitri Dupuis-Latour, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1568 days.

(21) Appl. No.: 11/811,292

(22) Filed: Jun. 8, 2007

(65) Prior Publication Data

US 2008/0303828 A1 Dec. 11, 2008

(51) Int. Cl.
*G06T 13/00* (2011.01)
(52) U.S. Cl.
USPC .......................................... 345/473; 345/474
(58) Field of Classification Search
USPC .................................................. 345/473, 474
See application file for complete search history.

(56) References Cited

U.S. PATENT DOCUMENTS

| | | | | |
|---|---|---|---|---|
| 5,261,041 A | * | 11/1993 | Susman | 345/473 |
| 5,404,437 A | * | 4/1995 | Nguyen | 715/203 |
| 5,732,267 A | * | 3/1998 | Smith | 713/1 |
| 6,297,830 B1 | * | 10/2001 | Hoddie et al. | 345/473 |
| 6,957,392 B2 | * | 10/2005 | Simister et al. | 715/746 |
| 7,173,623 B2 | * | 2/2007 | Calkins et al. | 345/473 |
| 7,234,086 B1 | * | 6/2007 | de Koos et al. | 714/704 |
| 7,903,115 B2 | * | 3/2011 | Platzer et al. | 345/473 |
| 2002/0145611 A1 | * | 10/2002 | Dye et al. | 345/543 |
| 2003/0140121 A1 | * | 7/2003 | Adams | 709/219 |
| 2005/0088443 A1 | * | 4/2005 | Blanco et al. | 345/473 |
| 2005/0117121 A1 | * | 6/2005 | Meerleer | 353/30 |
| 2006/0055700 A1 | * | 3/2006 | Niles et al. | 345/473 |
| 2007/0172144 A1 | * | 7/2007 | Zhang et al. | 382/274 |
| 2007/0285500 A1 | * | 12/2007 | Ma et al. | 348/14.07 |
| 2008/0165210 A1 | * | 7/2008 | Platzer et al. | 345/672 |
| 2008/0168402 A1 | * | 7/2008 | Blumenberg | 715/863 |
| 2008/0301602 A1 | * | 12/2008 | Koelbl et al. | 716/5 |

OTHER PUBLICATIONS

Ajaxian "Script.aculo.us 1.7 beta: Now with Morphing" Nov. 22, 2006: http://ajaxian.com/archives/scriptaculous-17-beta-now-with-morhphing.

* cited by examiner

*Primary Examiner* — Jeffrey Chow
(74) *Attorney, Agent, or Firm* — Womble Carlyle Sandridge & Rice LLP

(57) ABSTRACT

Approaches providing web-based animations using tools and techniques that take into account the limited capabilities and resources available in the web environment are disclosed. In some embodiments, such web-based animations are implemented in JavaScript.

13 Claims, 8 Drawing Sheets

WEB-BASED ANIMATION

BACKGROUND OF THE INVENTION

Animations are ubiquitous in various computing frameworks. For example, many web pages and web application include animations. Certain techniques and tools used to create and render animations in computing environments are not practical and/or optimized for web-based animations. For example, in a web environment, a browser typically is used to render an animation. But a browser or other client may have more limited resources than other platforms or frameworks for which existing animation tools have been designed and/or optimized.

BRIEF DESCRIPTION OF THE DRAWINGS

Various embodiments of the invention are disclosed in the following detailed description and the accompanying drawings.

DETAILED DESCRIPTION

Figure 1:
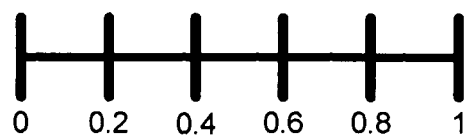
FIG. 1 illustrates a graphical representation of the progress marks of an animation that includes six frames.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Approaches providing web-based animations using tools and techniques that take into account the limited capabilities and resources available in the web environment are disclosed. In some embodiments, the functionalities described herein are associated with a client JavaScript animation API. In some such cases, the client JavaScript animation API is based at least in part on the API of the NSAnimation class of Apple Inc.'s Cocoa framework. Objects of the NSAnimation class manage the timing and progress of animations. In some embodiments, an animation is programmatically represented by an object, i.e. an instance of an associated class. Multiple animations may possibly simultaneously be performed on the same display page element or node by different animation instances. Although JavaScript is a prototype-based language, it is useful, in some embodiments, to make JavaScript at least in part mimic aspects of object oriented behavior so that useful characteristics of the object oriented paradigm such as encapsulation and reuse can be obtained. In some embodiments, a JavaScript animation API is implemented using such an approach. In some such cases, a JavaScript animation class is created from which animation objects may be instantiated. As used herein, a JavaScript "class" actually comprises a JavaScript function implemented in a manner that at least in part allows the function to mimic the functionality of a class in an object oriented paradigm. The animation functionalities described herein are not limited to client-side JavaScript. Rather, the animation functionalities described herein may be implemented and/or employed using any other appropriate language, framework, and/or programming paradigm.

Techniques for creating animations are described in U.S. patent application Ser. No. 10/826,973, entitled "Animation of an Object Using Behaviors", filed Apr. 16, 2004, which is incorporated herein by reference for all purposes.

In some embodiments, the parameters associated with configuring an animation which may be specified for the animation and/or may be computed from one or more specified parameters include a duration, a frame rate, and/or an animation curve. The duration parameter specifies the duration in units of time of an animation. The frame rate parameter specifies the number of updates or frames per unit of time. The animation curve parameter specifies the relative frame rate or speed of the animation over its course from start to finish. For example, a linear animation curve specifies a constant frame rate. Each frame comprising an animation can be represented by a progress mark. Each progress mark is associated with a percentage of the animation completed. For example, the progress mark associated with the first frame of an animation has a value of 0, and the progress mark associated with the last frame of an animation has a value of 1. FIG. 1 illustrates a graphical representation of the progress marks of an animation that includes six frames.

Figure 2:
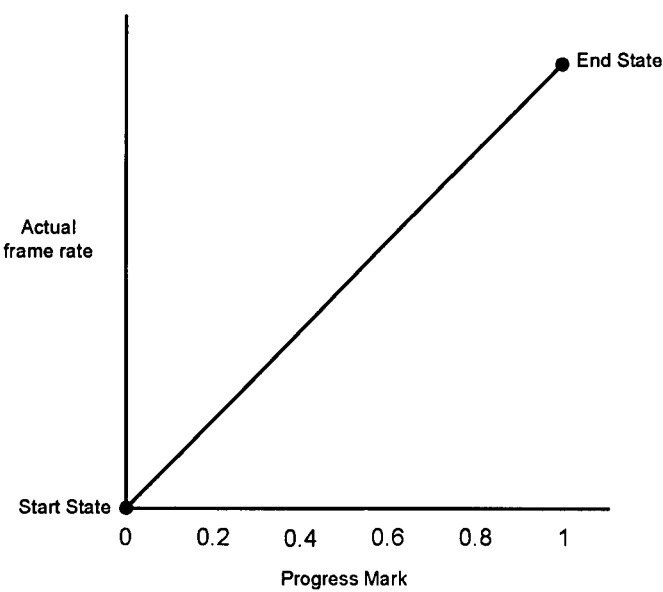
FIG. 2 illustrates an embodiment of a linear an animation curve.
Figure 3A:
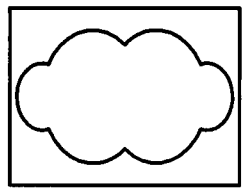
FIG. 3(a) illustrates an embodiment of a display sequence of frames.
Figure 3A:
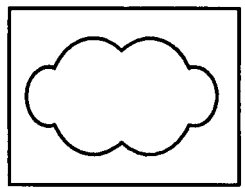
Figure 3A:
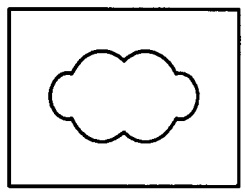
Figure 3A:
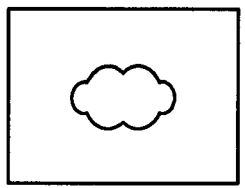
Figure 3A:
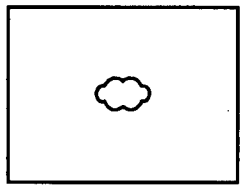
Figure 3A:
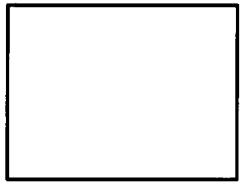
Figure 3B:
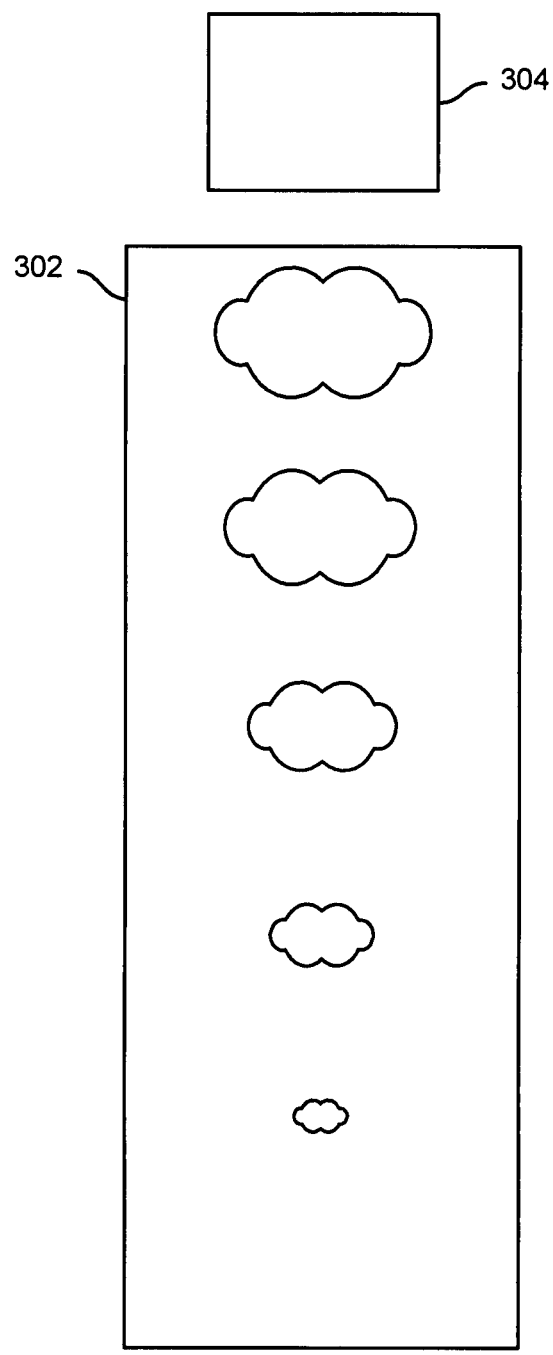
FIG. 3(b) illustrates an embodiment of a background image and a window.
Figure 3C:
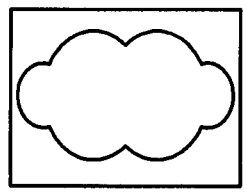
FIG. 3(c) illustrates an embodiment of a display sequence of frames resulting from a linear animation curve.
Figure 3C:
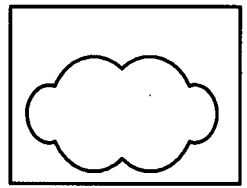
Figure 3C:
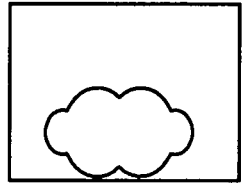
Figure 3C:
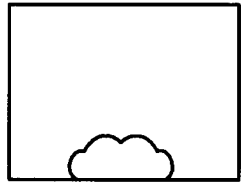
Figure 3C:
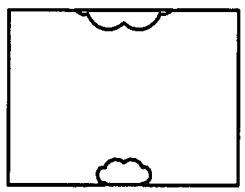
Figure 3C:
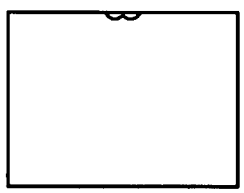

The animation curve of an animation is employed to determine the speed of the animation. In existing animation APIs (e.g., NSAnimation), one of a set of predefined animation curves (e.g., Linear, EaseIn, EaseOut, EaseInOut in NSAnimation) must be selected or, if not specified, a default type is automatically employed. FIG. 2 illustrates an embodiment of a linear an animation curve. In the given example, the x-axis represents the progress mark value of an animation, and the y-axis represents actual frame rate. It may not be possible, however, to achieve a desired animation effect using a predefined animation curve. For example, suppose it is desired to create the effect of a dissipating poof of smoke centered in a window. FIG. 3(a) illustrates the display sequence of frames desired for such an animation. Such an animation may be achieved, for example, by changing the vertical (y-axis) display position of a background image 302 that includes all of the poof images relative to the fixed display position of the window 304 as depicted in FIG. 3(b). However, it may not be possible to achieve the desired animation effect if the actual speed of the animation of the position of the background image 302 is interpolated from a predefined animation curve. FIG. 3(c) illustrates a display sequence of frames that may result using a linear animation curve that results in the desired effect of the animation to be spoiled. In some embodiments, in order to obtain a desired sequence for an animation (e.g., as illustrated in FIG. 3(a)), a custom animation curve can be specified. This can be done, for example, by defining an animation curve class, and passing an instance (e.g., a singleton) of such a class as an animation curve parameter to an animation object instead of a predefined animation curve type. Such a technique effectively allows a custom animation curve to be defined, and a user is not limited to a predefined set of animation curve types which may or may not be appropriate for a desired animation. In some embodiments, the instance of the animation curve class can be configured to implement a step or other discrete or discontinuous function to enable a developer to control with precision the frame-by-frame progress of an animation, for example to ensure that the poof of smoke image parts are displayed in full and centered in the window in the example described above. In some embodiments, the instance of the animation curve class can be configured to override the default animation curve (e.g., linear) associated with an animation.

In some embodiments, controlling an animation comprises determining for each of a plurality of frames a corresponding desired progress point and passing to an animation software object configured to provide the animation, as an animation curve argument, a custom animation curve object or function configured to provide to the animation software object the output of a step or similar function, such that the progress point returned by the animation curve object at any time is one of a finite number of values, each corresponding to a desired progress point of a frame with which it is associated.

The state changes or events associated with an animation are triggered by a timer. In existing implementations, each animation typically is associated with a dedicated timer that runs at the frame rate of the animation. When the timer fires (i.e. at each tick of the timer), the associated animation progresses to a next state (e.g., frame) associated with the next progress mark. Each timer, however, consumes processing resources. Thus, associating a dedicated timer with each animation becomes inefficient when many animations exist, e.g., for a display page element or an entire display page, and may even slow down the animations. In some embodiments, a single animation timer is employed to trigger animation events for multiple animations with possibly different frame rates. In some embodiments, a single animation timer runs at a maximum rate. In some embodiments, the maximum rate comprises a maximum rate of the animation timer. In some embodiments, the animation timer runs at a maximum frame rate associated with animations or the group of animations currently controlled by the timer. Animation events of an animation occur at a multiple (which depends on the frame rate of the animation) of a period of the animation timer, until the animation is complete. In some embodiments, the frame rate of the animation timer is much higher than the frame rates associated with animations so that nearly continuous frame rate values can be selected for animations.

Figure 4:
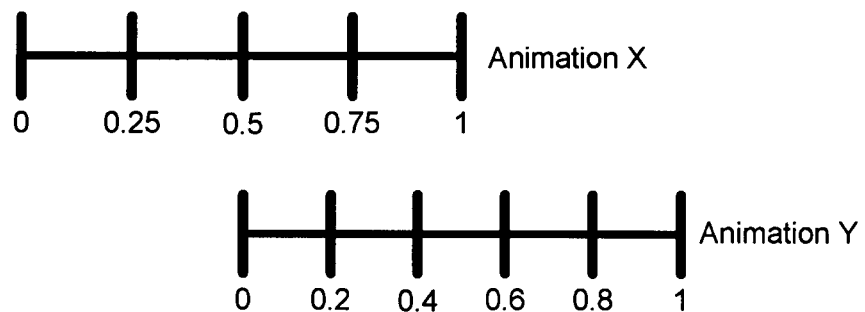
FIG. 4 illustrates an embodiment of the progress graphs of two linked animations.

In some embodiments, the running or progressions of two or more animations can be linked. For example, a second animation may be configured to start when a first animation reaches a specified progress mark. FIG. 4 illustrates an embodiment of the progress graphs of two linked animations. In the given example, Animation Y is started when Animation X reaches a progress mark value of 0.5. In some embodiments, it is desirable to start the second animation on the refresh cycle associated with the specified progress mark value (e.g., 0.5 in the example of FIG. 4) of the first animation. In some embodiments, this functionality is implemented in JavaScript, for example, by determining whether the length of an array associated with registered animations (the length of which indicates how many animations are currently being rendered, e.g., by an associated browser) has changed at the start of a refresh cycle prior to making state changes to in-progress animations so that any linked animations can be triggered at the specified progress marks (i.e. in the current refresh cycle) rather than the next. In some embodiments, the array is used at least in part to track animations that share a common frame rate. In some embodiments, the shared single timer approach described above is used, and the array is used in part to keep track of how many and/or which animations are sharing the timer. For example, such an array may be used to determine when animation events should be triggered for each respective animation.

In some embodiments, an animation comprises changing a style property of a display page element or node. One or more style properties such as display properties associated with position, size, color, font, etc., may be associated with an element. In some embodiments, a style property of a display page element is defined using CSS. In some embodiments, functionality associated with changing a style property of an element from a prescribed start state to a prescribed end state, e.g., based at least in part on an associated animation curve, is defined in an animation API, for example, as a JavaScript or other class definition. Although employing CSS to specify style properties is described in some of the examples herein, the techniques described can be achieved with any other appropriate syntax or language that can be employed to specify display properties.

In some embodiments, the parameters associated with defining and/or configuring a CSS or other animation of a style property of an element or node (e.g., the arguments associated with an instance of an associated class) include one or more of a duration, frame rate, animation curve, an identifier that identifies the element or node on which to perform the animation, a start state value of the style property, and an end state value of the style property. In some embodiments, the "currentStyle" API available with most browsers can be employed to determine the start state value of a CSS animation.

Different ways exist to specify style information, e.g., in an HTML document. For example, style information can be embedded in an HTML document using HTML <style></style> tags, CSS style information can be specified for an element in-line using the "style" attribute, and/or CSS code can be included in one or more external files that can be linked to or imported. Thus, in some embodiments, it may be difficult to manually determine the end state of a CSS animation.

Figure 5:
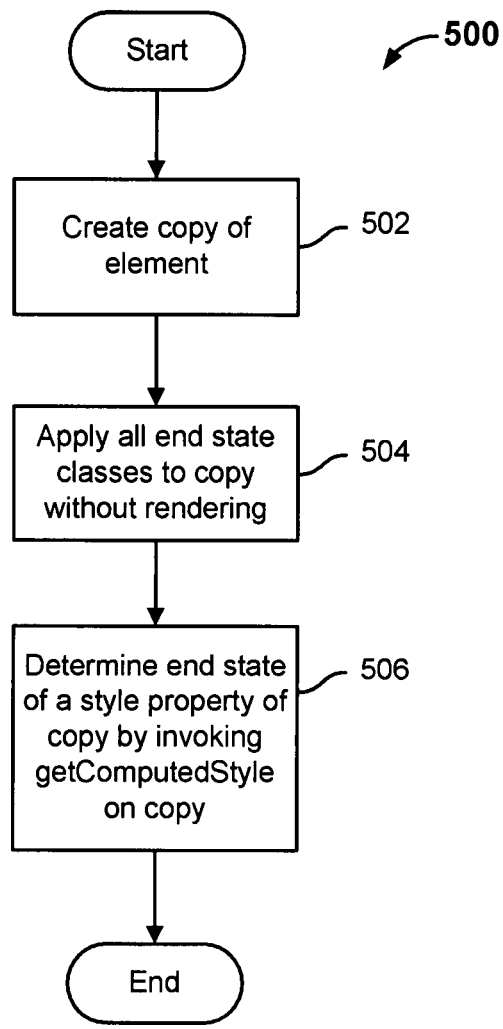
FIG. 5 illustrates an embodiment of a process for determining the end state of a CSS animation associated with an element or node.

FIG. 5 illustrates an embodiment of a process for determining the end state of a CSS animation associated with a display page element or node. Process 500 starts at 502 at which a clone or copy of a display page element being animated is created. In some embodiments, this copy of the display page element is used to determine the end state style of the CSS animation and is not rendered or displayed. At 504, all end state classes that define the end state style of the display page element (e.g., the style associated with the display page element at the conclusion of an animation associated with the display page element) are applied to the copy so that it is styled as the display page element would be styled at the end of the animation. At 506, the getComputedStyle API available at most browsers is invoked on the copy to determine the end state value of the style property associated with the CSS animation. Process 500 subsequently ends.

In some embodiments, multiple CSS animations may be applied to an element or node. In some such cases, a plurality of CSS animations associated with an element may be updated at the same instance of time, e.g., at the same timer event or tick. In such cases, a browser has to parse and apply the updated style property associated with each CSS animation individually on the element. Although a browser may buffer a display before rendering so that all updates appear to be applied at the same time, updating the style of a frame of an element in individual operations for each CSS animation is inefficient. It would be useful to update all style properties of an element that change at a given instance (e.g., when an associated timer fires) or for a given frame in one operation.

Figure 6:
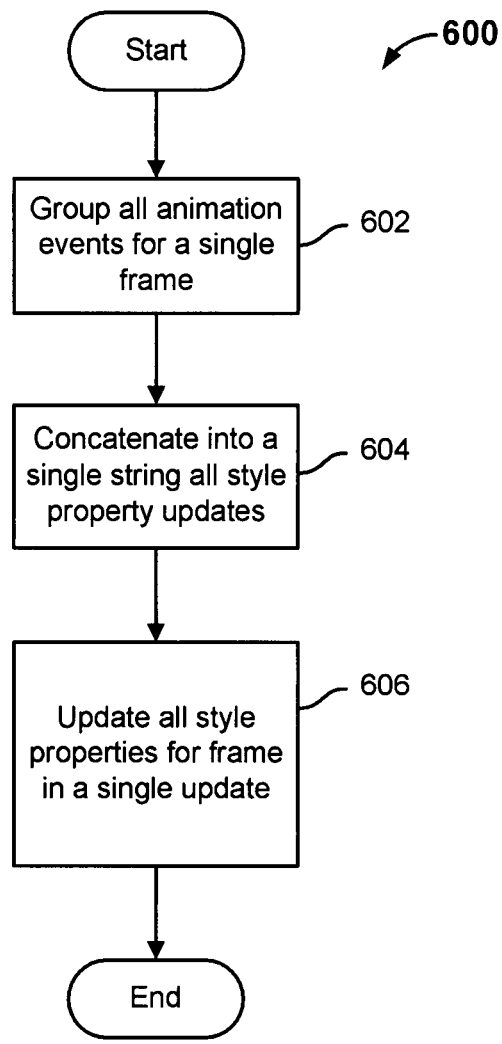
FIG. 6 illustrates an embodiment of a process for updating the style of a frame in a single operation.

FIG. 6 illustrates an embodiment of a process for updating the style of a frame of a display page animation. In some embodiments, the style of the frame is updated using a single "style" operation. Process 600 starts at 602 at which all CSS animation events for a given frame of a display page element are grouped together. In some embodiments, a JavaScript class is defined to group CSS animation events for a given frame. At 604, all style property updates associated with the CSS animation events included in a group are concatenated into a single string. At 606, the style of the frame is updated in a single "style" update, e.g., using the cssText property or setAttribute ("style",newState) where newState is the new css state as a string. In some embodiments, the style is updated in-line so that style properties defined in other parts of an associated HTML page are overridden. Process 600 subsequently ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for triggering animation events, comprising:
configuring an animation timer to fire at a maximum rate, wherein the maximum rate corresponds to a recurring period of the animation timer, and wherein at the expiry of each recurring period the animation timer fires;
configuring a first animation composed of a first plurality of frames to progress to a next frame in the first plurality of frames each time a first multiple of the recurring period expires, wherein the first multiple is calculated based on a first frame rate of the first animation and the maximum rate;
configuring a second animation composed of a second plurality of frames to progress to a next frame in the second plurality of frames each time a second multiple of the recurring period expires, wherein the second multiple is calculated based on a second frame rate of the second animation and the maximum rate, and
the first frame rate and the second frame rate are different, thereby causing the calculated first and second multiples to be different;
activating the animation timer to cause the first animation and the second animation to be displayed, wherein the first animation is displayed at the first frame rate and the second animation is displayed at the second frame rate.

2. The method as recited in claim 1, wherein the maximum rate comprises a maximum of the first frame rate and the second frame rate.

3. The method as recited in claim 1, wherein the maximum rate of the animation timer is higher than a maximum of the first frame rate and the second frame rate.

4. The method as recited in claim 1, wherein the animation timer is associated with a browser configured to display the first animation and the second animation.

5. The method as recited in claim 1, wherein the animation timer comprises an instance of a JavaScript class.

6. A system for triggering animation events, comprising:
a processor; and
a memory storing instructions that, when executed, cause the processor to:
configure an animation timer to fire at a maximum rate, wherein the maximum rate corresponds to a recurring period of the animation timer, and wherein at the expiry of each recurring period the animation timer fires;
configure a first animation composed of a first plurality of frames to progress to a next frame in the first plurality of frames each time a first multiple of the recurring period expires, wherein the first multiple is calculated based on a first frame rate of the first animation and the maximum rate;
configure a second animation composed of a second plurality of frames to progress to a next frame in the second plurality of frames each time a second multiple of the recurring period expires, wherein the second multiple is calculated based on a second frame rate of the second animation and the maximum rate, and
the first frame rate and the second frame rate are different, thereby causing the calculated first and second multiples to be different;
activate the animation timer to cause the first animation and the second animation to be displayed, wherein the first animation is displayed at the first frame rate and the second animation is displayed at the second frame rate.

7. The system as recited in claim 6, wherein the maximum rate comprises a maximum of the first frame rate and the second frame rate.

8. The system as recited in claim 6, wherein the maximum rate of the animation timer is higher than a maximum of the first frame rate and the second frame rate.

9. A computer program product for triggering animation events, the computer program product being embodied in a non-transitory computer readable storage medium and comprising computer instructions for:
configuring an animation timer to fire at a maximum rate, wherein the maximum rate corresponds to a recurring period of the animation timer, and wherein at the expiry of each recurring period the animation timer fires;
configuring a first animation composed of a first plurality of frames to progress to a next frame in the first plurality of frames each time a first multiple of the recurring period expires, wherein the first multiple is calculated based on a first frame rate of the first animation and the maximum rate;
configuring a second animation composed of a second plurality of frames to progress to a next frame in the second plurality of frames each time a second multiple of the recurring period expires, wherein the second multiple is calculated based on a second frame rate of the second animation and the maximum rate, and the first frame rate and the second frame rate are different, thereby causing the calculated first and second multiples to be different;

activating the animation timer to cause the first animation and the second animation to be displayed, wherein the first animation is displayed at the first frame rate and the second animation is displayed at the second frame rate.

10. The computer program product as recited in claim 9, wherein the maximum rate comprises a maximum of the first frame rate and the second frame rate.

11. The computer program product as recited in claim 9, wherein the maximum rate of the animation timer is higher than a maximum of the first frame rate and the second frame rate.

12. The computer program product as recited in claim 9, wherein the animation timer is associated with a browser configured to display the first animation and the second animation.

13. The computer program product as recited in claim 9, wherein the animation timer comprises an instance of a JavaScript class.

\* \* \* \* \*